(12) United States Patent
Ohashi et al.

(10) Patent No.: US 11,618,110 B2
(45) Date of Patent: Apr. 4, 2023

(54) SOLDER PASTE AND MOUNTING STRUCTURE

(71) Applicant: Panasonic Intellectual Property Management Co., Ltd., Osaka (JP)

(72) Inventors: Naomichi Ohashi, Hyogo (JP); Koso Matsuno, Osaka (JP); Yasuhiro Okawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 17/073,461

(22) Filed: Oct. 19, 2020

(65) Prior Publication Data

US 2021/0129273 A1 May 6, 2021

(30) Foreign Application Priority Data

Nov. 1, 2019 (JP) .............................. JP2019-199966

(51) Int. Cl.
*B23K 35/362* (2006.01)
*B23K 35/36* (2006.01)
*B23K 35/26* (2006.01)

(52) U.S. Cl.
CPC .......... *B23K 35/362* (2013.01); *B23K 35/262* (2013.01); *B23K 35/264* (2013.01); *B23K 35/3613* (2013.01); *B23K 35/3618* (2013.01)

(58) Field of Classification Search
CPC ............................. B23K 35/362; B23K 35/262
USPC ........................................................... 148/23
See application file for complete search history.

(56) References Cited

U.S. PATENT DOCUMENTS

| | | | |
|---|---|---|---|
| 2002/0095783 A1* | 7/2002 | Kirsten | H01L 21/563 29/841 |
| 2005/0170284 A1* | 8/2005 | Lee | G03F 7/0751 430/270.1 |
| 2011/0095423 A1 | 4/2011 | Ohashi et al. | |

FOREIGN PATENT DOCUMENTS

| | | |
|---|---|---|
| JP | 62-292297 | 12/1987 |
| JP | 2013-123078 | 6/2013 |

* cited by examiner

*Primary Examiner* — Weiping Zhu

(74) *Attorney, Agent, or Firm* — Wenderoth, Lind & Ponack, L.L.P.

(57) ABSTRACT

A solder paste includes a solder powder; and a flux component containing a compound having at least one carboxyl group protected by a trialkylsilyl group.

6 Claims, 1 Drawing Sheet

SOLDER PASTE AND MOUNTING STRUCTURE

BACKGROUND

1. Technical Field

The present disclosure relates to a solder paste for electrically connecting a surface mount (SMT) component to a circuit board and a mounting structure using the same.

2. Description of the Related Art

When mounting a component such as an electronic component on a circuit board, a solder paste is usually used to bond the electronic component and the circuit board. For example, Japanese Patent Unexamined Publication No. 2013-123078 discloses that a mixed paste containing a resin material and a solder material is used to mount a semiconductor on a circuit board (for example, claim 11).

SUMMARY

A solder paste according to one aspect of the present disclosure contains a solder powder; and a flux component containing a compound having at least one carboxyl group protected by a trialkylsilyl group.

According to another aspect of the present disclosure, provided is a mounting structure that an electronic component is mounted on a board, in which an electrode of the electronic component and an electrode of the board are bonded by a solder bonding portion formed using the solder paste stated above.

DETAILED DESCRIPTIONS

Figure 1:
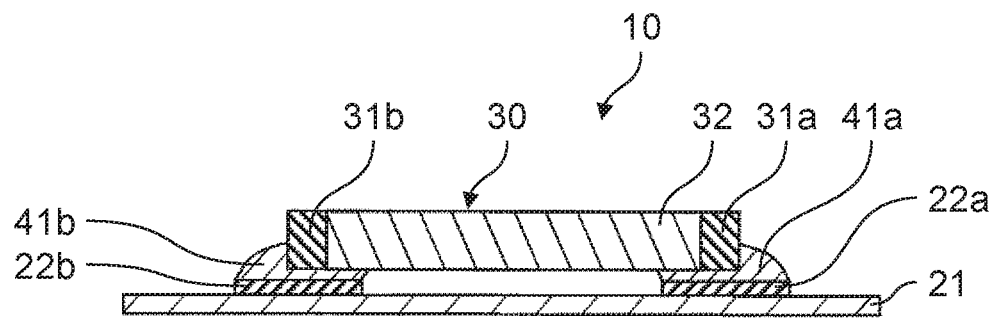
FIG. 1 is a cross-sectional view of a mounting structure according to a second exemplary embodiment of the present disclosure.

The inventors of the present disclosure have found that, when a flux component is further added to the mixed paste of Japanese Patent Unexamined Publication No. 2013-123078, physical properties upon storing and soldering the solder paste may deteriorate depending on a type of a solder material.

It is an object of the present disclosure to provide a solder paste containing a flux component, which has excellent physical properties upon storage and soldering.

Hereinafter, exemplary embodiments of the present disclosure will be described.

First Exemplary Embodiment

The present exemplary embodiment relates to solder paste.

The solder paste of the present exemplary embodiment contains solder powder and a flux component containing a compound having at least one carboxyl group protected by a trialkylsilyl group.

A solder is an alloy having a relatively low melting point (for example, a melting point lower than 450° C.). The solder can be used, for example, to bond a board such as a circuit board to an electronic component.

Solder powder is a solder that is in powder form. A shape of the solder powder is not particularly limited, but examples thereof include a spherical shape and shapes other than the spherical shape such as a flat shape.

An average particle diameter of the solder powder may be, for example, 10 μm or more and 35 μm or less, 15 μm or more and 30 μm or less, and 20 μm or less and 25 μm or less. In this specification, the average particle diameter is a particle diameter (D50) at a point where a cumulative value reaches 50% in a cumulative curve in which a particle diameter distribution is obtained on a volume basis and the total volume is 100%. The average particle diameter can be measured using a laser diffraction/scattering measurement device of particle diameter and particle diameter distribution or an electron scanning microscope.

The solder powder preferably contains at least two selected from the group consisting of Sn, Bi, In, and Ag. Among those, the solder powder is more preferably Sn-based alloy. The Sn-based alloy herein means an alloy containing Sn atoms, of which examples include an alloy selected from the group consisting of Sn—Bi-based alloy, Sn—In-based alloy, Sn—Bi—In-based alloy, Sn—Bi—Sb-based alloy, Bi—In-based alloy, Sn—Ag-based alloy, Sn—Cu-based alloy, Sn—Ag—Cu-based alloy, Sn—Ag—Bi-based alloy, Sn—Cu—Bi-based alloy, Sn—Ag—Cu—Bi-based alloy, Sn—Ag—In-based alloy, Sn—Cu—In-based alloy, Sn—Ag—Cu—In-based alloy, and Sn—Ag—Cu—Bi—In-based alloy.

Specific examples of the solder powder include Sn-(40-70)Bi-based alloy, Sn-(30-70)In-based alloy, and Sn-(40-70)Bi-(30-50)In-based alloy. Herein, for example, "Sn-(40-70)Bi" means an alloy containing Bi of 40% by weight or more and 70% by weight or less and the balance being Sn.

The solder powder preferably has a melting point of 140° C. or lower. The lower limit of the melting point of the solder powder is not particularly set, but may be 80° C. or higher. The melting point is a value measured using a thermogravimetric differential thermal analyzer (TG/DTA). More preferably, the solder powder has a melting point of 140° C. or lower and contains at least two selected from the group consisting of Sn, Bi, In, and Ag.

The flux component removes an oxide film existing in the solder powder with the carboxyl group of a compound contained in the flux component. In the solder paste of the present exemplary embodiment, the flux component contains a compound having at least one carboxyl group protected by a trialkylsilyl group (hereinafter sometimes referred to as an "acid-based compound").

The "trialkylsilyl group" means a group represented by —SiR$^1$R$^2$R$^3$, and R$^1$, R$^2$, and R$^3$ each independently represent an alkyl group. In the alkyl group, a hydrogen atom may be substituted with a substituent or may be unsubstituted. The alkyl group is, for example, a methyl group, an ethyl group or the like, and a methyl group is preferable.

Examples of the trialkylsilyl group include a trimethylsilyl group, a triethylsilyl group, a tert-butyldimethylsilyl group, a triisopropylsilyl group, and the like, and a trimethylsilyl group is preferable.

The term "protect" means introducing a trialkylsilyl group into a carboxyl group to form a chemically inert functional group.

Examples of the "carboxyl group protected with a trialkylsilyl group" (hereinafter sometimes referred to as a "protected carboxyl group") include a group represented by —COO—SiR$^1$R$^2$R$^3$.

If the carboxyl group is present in the solder paste, a reaction may occur between the carboxyl group contained in the flux component and the solder powder to form a carboxyl group-metal salt even upon storing the solder paste. When the carboxyl group reacts with the solder powder, the content of the carboxyl group contained in the solder paste is reduced, and the physical properties of the solder paste may be deteriorated. The deterioration of the physical properties of the solder paste refers to that, for example, the aggregating property of the solder paste is deteriorated (e.g. the solder is less likely to be aggregated at a bonding portion between the board and the electronic component during soldering), the wettability is decreased, and the viscosity is raised. In addition, in the specification, "storing/storage" means leaving stand still at room temperature, for example, under the environment of 25° C.

On the other hand, in the solder paste of the present exemplary embodiment, a protected carboxyl group is present during storage, and the protected carboxyl group is hydrolyzed to the carboxyl group by heating. Therefore, the carboxyl group-metal salt is unlikely to be generated during storage in the solder paste of the present exemplary embodiment. Accordingly, the solder paste of the present exemplary embodiment has advantageous features that the deterioration of the physical properties of the solder paste, as stated above, is unlikely to occur; in other words, the physical properties can be kept good during storage. Further, in the solder paste of the present exemplary embodiment, the oxide film on the surface of the solder powder can be removed by the carboxyl group, and thus the board and the electronic component can be satisfactorily bonded. For example, the connection resistance between the board and the electronic component can be kept low. The term "soldering" means, for example, bonding a board and an electronic component with a solder paste, which is carried out by heating. The heating temperature can be exemplified as a temperature usually employed for soldering (for example, 120° C. or higher and 270° C. or lower).

The acid-based compound may contain, for example, one or more protected carboxyl groups, one or more and two or less protected carboxyl groups, or only one protected carboxyl group.

In one aspect, the protected carboxyl groups are derived from one or both aliphatic and aromatic carboxylic acids. The term "derived from" means being a part of the aliphatic carboxylic acid and the aromatic carboxylic acid, and specifically, it has a structure in which a hydrogen atom of a carboxylic acid (that is, —COOH) is eliminated in the aliphatic carboxylic acid and the aromatic carboxylic acid.

Examples of the aliphatic carboxylic acid include monocarboxylic acid (for example, monocarboxylic acid having 1 to 12 carbon atoms), dicarboxylic acid (for example, dicarboxylic acid having 1 to 12 carbon atoms), and tricarboxylic acid (for example, tricarboxylic acid having 1 to 12 carbon atoms). The aliphatic carboxylic acid is not particularly limited, but specific examples thereof include saturated aliphatic monocarboxylic acids such as levulinic acid, lauric acid, myristic acid, and palmitic acid; unsaturated aliphatic monocarboxylic acids such as crotonic acid; saturated aliphatic dicarboxylic acids such as oxalic acid, malonic acid, succinic acid, glutaric acid, adipic acid, pimelic acid, suberic acid, azelaic acid, and sebacic acid; unsaturated aliphatic dicarboxylic acids such as maleic acid and fumaric acid; and tricarboxylic acids such as 1,2,3-propanetricarboxylic acid.

The aromatic carboxylic acid is not particularly limited, but examples thereof include phthalaldehyde acid, phenylbutyric acid, phenoxyacetic acid, and phenylpropionic acid.

In this aspect, examples of the acid-based compound include the aliphatic carboxylic acids and aromatic carboxylic acids exemplified above, in which the carboxyl group is protected by the trialkylsilyl group. Specific examples thereof include bistrimethylsilyl malonate, bistrimethylsilyl succinate, bistrimethylsilyl glutarate, trimethylsilyl levulinate (pentanoic acid, 4-oxo-, trimethylsilyl ester), and the like. Among those, the acid-based compound is preferably at least one selected from the group consisting of bistrimethylsilyl malonate and trimethylsilyl levulinate.

In this aspect, the acid-based compound may be contained in an amount of 0.6 parts by mass or more and 10 parts by mass or less, or 1.0 part by mass or more and 10 parts by mass or less, based on 100 parts by mass of the solder powder.

In this aspect, the acid-based compound may be contained in an amount of 5 parts by mass or more, or 10 parts by mass or more, based on 100 parts by mass of the flux component. The upper limit of the content of the acid-based compound is not particularly set, but may be, for example, 100 parts by mass, or alternatively, 25 parts by mass or less, based on 100 parts by mass of the flux component.

In one aspect, the protected carboxyl groups are derived from rosin acid. The term "derived from" means being a part of a structure of the rosin acid, and specifically, it has a structure in which a hydrogen atom of a carboxylic acid (that is, —COOH) contained in the rosin acid is eliminated.

The rosin acid refers to a compound which is a main component contained in rosin. Examples of the rosin acid include pimaric acid, palustric acid, impimal acid, abietic acid, dehydroabietic acid, neoabietic acid, and the like. Examples of the rosin include natural rosin, polymerized rosin, hydrogenated rosin, and modified rosin.

In the aspect stated above, examples of the acid-based compound include a compound in which the carboxyl group contained in the rosin acid described above is protected by the trialkylsilyl group.

In the aspect stated above, the acid-based compound may be contained in an amount of 0.6 parts by mass or more and 10 parts by mass or less, or 1.0 part by mass or more and 10 parts by mass or less, based on 100 parts by mass of the solder powder.

In the aspect stated above, the acid-based compound may be contained in an amount of 5 parts by mass or more, or 10 parts by mass or more, based on 100 parts by mass of the flux component. The upper limit of the content of the acid-based compound is not particularly set, but may be, for example, 25 parts by mass or less based on 100 parts by mass of the flux component.

In the present exemplary embodiment, the flux component may be contained in an amount of 0.1 parts by mass or more and 10 parts by mass or less, or 1.0 parts by mass or more and 10 parts by mass or less, based on 100 parts by mass of the solder powder.

In the present exemplary embodiment, the solder paste may further contain a thermosetting resin. In a case where the solder paste contains a thermosetting resin, curing of the thermosetting resin is accelerated when a reaction product of the carboxyl group and the solder powder is present. However, in the present disclosure, since the protected carboxyl group is present during storage, the reaction between the carboxyl group and the solder powder is unlikely to occur. Accordingly, curing of the thermosetting resin and increase in viscosity of the solder paste caused by curing are less likely to occur. The viscosity stated above is a value measured at 25° C., for example, a value measured using an E-type viscometer.

The thermosetting resin is not particularly limited, but an epoxy resin can be used.

Examples of the epoxy resin include bisphenol A epoxy resin, bisphenol F epoxy resin, bisphenol S epoxy resin, glycidyl amine resin, alicyclic epoxy resin, aminopropane epoxy resin, biphenyl epoxy resin, naphthalene epoxy resin, anthracene epoxy resin, triazine epoxy resin, dicyclopentadiene epoxy resin, triphenylmethane epoxy resin, fluorene epoxy resin, phenol aralkyl epoxy resin, novolac epoxy resin, and the like. These may be used alone or in combination of two or more.

The epoxy resin used may be liquid at room temperature.

The solder paste of the present exemplary embodiment may contain, for example, the thermosetting resin in an amount of 5 parts by mass or more and 40 parts by mass or less, or 10 parts by mass or more and 30 parts by mass or less, based on to 100 parts by mass of the solder powder.

The thermosetting resin can be used in combination with a curing agent. The curing agent can be appropriately selected depending on use environment and application of the solder paste, and is not particularly limited, provided that examples thereof include thiol-based compounds, modified amine-based compounds, polyfunctional phenol-based compounds, imidazole-based compounds, and acid anhydride-based compounds. These may be used alone or in combination of two or more. The content of the curing agent is not particularly limited and can be appropriately adjusted depending on a type of the thermosetting resin.

For example, a bisphenol F epoxy resin may be used as the thermosetting resin, and an imidazole-based compound may be used as the curing agent.

In one aspect, in a case where the solder paste contains the rosin acid, it may also contain a compound other than rosin acid contained in the rosin.

In the present exemplary embodiment, the solder paste may further contain a solvent. In a case where the rosin is contained in the flux, it is particularly preferable to use a solvent.

The solvent is not particularly limited, but for example, an alcohol solvent, a glycol ether solvent, a carbitol solvent or the like can be used.

The solder paste of the present exemplary embodiment may contain other compounds, if necessary. Examples of the other compounds include viscosity adjusting/thixotropy imparting additive.

The viscosity adjusting/thixotropy imparting additive can include an inorganic or organic additive. Examples of the inorganic viscosity adjusting/thixotropy imparting additive include silica and alumina. Examples of the organic viscosity adjusting/thixotropy imparting additive include solid epoxy resins, low molecular weight amides, polyester resins, organic derivatives of castor oil, and organic solvents. These may be used alone or in combination of two or more.

The content of the viscosity adjusting/thixotropy imparting additive is not particularly limited, provided that it may be, for example, 0.2 parts by mass or more and 2 parts by mass or less, specifically 0.5 parts by mass, based on 100 parts by mass of the solder powder.

The content of the flux contained in the solder paste of the present exemplary embodiment is not particularly limited, and can be appropriately selected depending on the physical properties, the application, and the like, of the solder paste. For example, the solder paste may contain the flux in amount of 10 parts by mass or more and 40 parts by mass or less, or 15 parts by mass or more and 30 parts by mass or less, based on 100 parts by mass of the solder powder.

Second Exemplary Embodiment

Hereinafter, the present exemplary embodiment will be specifically described with reference to FIGS. 1 and 2. In the drawings, the same components are designated by the same reference numerals.

The present exemplary embodiment relates to mounting structure 10 shown in FIG. 1. Mounting structure 10 includes a circuit board, solder bonding portions 41a and 41b, and electronic component 30 (which is a chip component in the illustrated aspect). The circuit board has board 21 and board electrodes 22a and 22b, which are provided on the surface of board 21. Solder bonding portions 41a and 41b are portions that bond electronic component 30 and board 21. Electronic component 30 has element body 32, and electrodes 31a and 31b of electronic component 30. In mounting structure 10, electrode 22a of board 21 and electrode 31a of electronic component 30 are bonded by solder bonding portion 41a, and electrode 22b of board 21 and electrode 31b of electronic component 30 are bonded by solder bonding portion 41b.

Examples of electronic component include a chip component and a semiconductor component. The chip component may be, for example, a chip resistor component or a capacitor.

One example of a method for forming mounting structure 10 will be described with reference to FIGS. 2A and 2B.

Figure 2A:
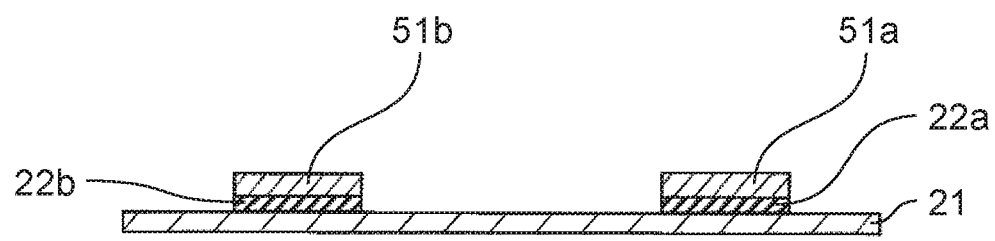
FIG. 2A is a cross-sectional explanatory view schematically illustrating an example of a method for forming the mounting structure, which is the second exemplary embodiment of the present disclosure.

As shown in FIG. 2A, electrodes 22a and 22b are provided on a surface of board 21, and solder pastes 51a and 51b are printed thereon using, for example, a metal mask. The solder paste according to the first exemplary embodiment of the present disclosure is used as solder pastes 51a and 51b.

Figure 2B:
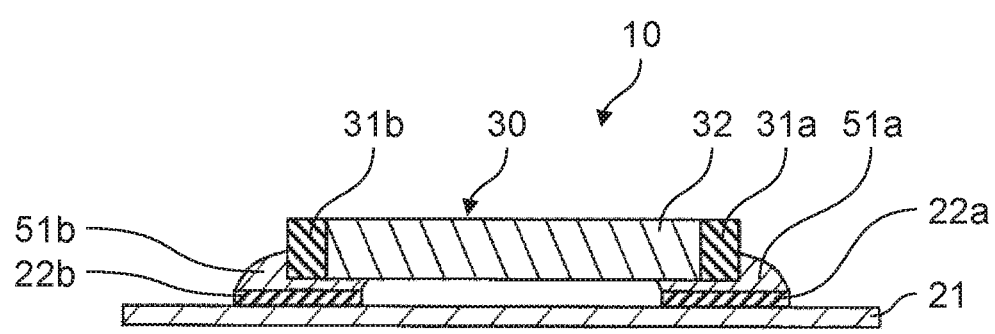
FIG. 2B is a cross-sectional explanatory view schematically illustrating an example of a method for forming the mounting structure, which is the second exemplary embodiment of the present disclosure.

As shown in FIG. 2B, electronic component 30 having element body 32 and electrodes 31a and 31b is arranged. At this time, electronic component 30 is arranged so that electrode 31a of electronic component 30 is disposed on solder paste 51a, and electrode 31b of electronic component 30 is disposed on solder paste 51b.

As shown in FIG. 2B, board 21 on which electronic component 30 is arranged is heated (reflow step). The heating temperature and the heating time are not particularly limited, and board 21 is heated under conditions that heating can be usually carried out.

As described above, the trialkylsilyl group is eliminated from the acid-based compound and the carboxylic acid is formed, due to heating in the reflow step. The carboxylic acid can act to remove the oxide film of the solder powder, and consequently, soldering can be carried out very well.

By employing the method as described above, solder pastes 51a and 51b become solder bonding portions 41a and 41b, respectively, and mounting structure 10 shown in FIG. 1 is obtained. In mounting structure 10, connection resistance of solder bonding portions 41a and 41b when electronic component 30 is mounted on board 21 can be suppressed low; in other words, a conductivity between board 21 and electronic component 30 can be improved.

Additionally, although the present exemplary embodiment describes the method for carrying out the heating in the reflow step, a preheating step may be provided to accelerate the elimination of the trialkylsilyl group.

As described above, in the present disclosure, the carboxyl group is protected by the trialkylsilyl group during storage of the solder paste, and thus the physical properties of the solder paste can be kept good during storage. By heating the solder paste, the trialkylsilyl group stated above is eliminated and the carboxylic acid is generated. The carboxylic acid can act to remove the oxide film of the solder powder, and therefore, excellent soldering can be available. In other words, according to the present disclosure, storage stability when stored as the solder paste is good, and it is possible to suppress the connection resistance of the solder bonding portion to a low level upon soldering, whereby both advantageous effects can be achieved.

EXAMPLES

Hereinafter, the present disclosure will be specifically described with reference to examples, but the present disclosure is not limited to the following examples.

Example 1

The following compounds are used to form the solder paste.

Solder powder: spherical particles having a composition of 42Sn-58Bi. An average particle diameter of this solder powder is 25 μm, and a melting point is 139° C.

Thermosetting resin: a resin "806" manufactured by Mitsubishi Chemical, which is a bisphenol F epoxy resin.

Acid-based compound: bistrimethylsilyl malonate.

Curing agent: "2P4MHZ" manufactured by Shikoku Chemicals, which is an imidazole-based curing agent.

Thixotropy imparting additive: castor oil-based additive ("THIXCIN R" manufactured by Elementis Japan).

The solder paste is prepared as follows.

0.5 part by weight of the thixotropy imparting additive is added to 20 parts by weight of the epoxy resin. The thixotropy imparting additive is dissolved by heating and stirring at 120° C. The resultant mixture is left to stand still to be cooled to the room temperature. 1 part by weight of the imidazole-based curing agent and 3 parts by weight of bistrimethylsilyl malonate are added to the resultant mixture, followed by kneading with a vacuum planetary mixer for 10 minutes to obtain a mixture. 100 parts by weight of solder powder is added to the mixture. The mixture is kneaded with a vacuum planetary mixer for 30 minutes to obtain a solder paste.

Next, the prepared solder paste is used to mount a chip component on a circuit board on which a wiring and electrodes are formed using Cu as follows.

Connection resistance of a 3216-sized chip resistor component is evaluated with the following methods.

The solder paste is printed through a metal mask having a thickness of 0.1 mm to be supplied on the electrodes of the circuit board on which electrodes and wirings are formed by Cu. The 3216-sized chip resistor component is mounted thereon, and passed through a reflow furnace of which the temperature is set to 160° C. for 5 minutes, whereby the mounting structure of the chip resistor component is obtained. Resistance of only the solder bonding portion is measured by a tester, and if the resistance is 1Ω or less, it is recognized as acceptable (indicated as "Good" in Table 1).

Evaluation of Viscosity Change

Changes in the viscosity of the solder paste is evaluated as follows. The viscosity is measured using an E-type viscometer (25° C., rotational speed of 5 rpm). After the solder paste is prepared, it is left to stand still at 25° C. for 1 hour to obtain the initial viscosity. The solder paste is left to stand still in an incubator controlled at 25° C. for 48 hours, and then the viscosity is measured.

If a ratio of the viscosity after leaving stand still at 25° C. for 48 hours to the initial viscosity is 1.2 times or less, it is recognized as acceptable (indicated as "Good" in Table 1); otherwise if it exceeded 1.2 times, it is recognized as unacceptable (indicated as "Poor" in Table 1).

In Example 1, the connection resistance of the 3216-sized chip resistor component is 0.2Ω, which is acceptable, and the changes in the viscosity of the solder paste is that the ratio of the viscosity after leaving stand still at 25° C. for 48 hours to the initial viscosity is 1.0, which is acceptable.

Examples 2 to 6, and Comparative Examples 1 to 8

In Examples 2 to 6 and Comparative Examples 1 to 8, the solder pastes are prepared in the same manner as in Example 1 except that the acid-based compounds and amounts shown in Table 1 are used instead of 3 parts by weight of bistrimethylsilyl malonate.

The changes in viscosity of the prepared solder paste and the connection resistance of the 3216-sized chip resistor component are evaluated for each of examples in the same manner as in Example 1.

Types of the acid-based compounds, blending amounts of the acid-based compounds based on 100 parts by weight of the solder powder and the results in Examples and Comparative Examples are summarized in Table 1.

TABLE 1

| | Acid-based Compound | | Evaluation of | Evaluation of |
|---|---|---|---|---|
| | Type | Blending Amount (parts by weight) | Connection Resistance | Changes in Viscosity |
| Example 1 | bistrimethylsilyl malonate | 3 | Good | Good |
| Example 2 | bistrimethylsilyl malonate | 6 | Good | Good |
| Example 3 | bistrimethylsilyl malonate | 2 | Good | Good |
| Example 4 | trimethylsilyl levulinate | 3 | Good | Good |
| Example 5 | trimethylsilyl levulinate | 6 | Good | Good |
| Example 6 | trimethylsilyl levulinate | 2 | Good | Good |

TABLE 1-continued

|  | Acid-based Compound | | Evaluation of Connection Resistance | Evaluation of Changes in Viscosity |
|---|---|---|---|---|
|  | Type | Blending Amount (parts by weight) | | |
| Comparative Example 1 | malonic acid | 3 | Good | Poor |
| Comparative Example 2 | malonic acid | 6 | Good | Poor |
| Comparative Example 3 | malonic acid | 2 | Good | Poor |
| Comparative Example 4 | levulinic acid | 3 | Good | Poor |
| Comparative Example 5 | levulinic acid | 6 | Good | Poor |
| Comparative Example 6 | levulinic acid | 2 | Good | Poor |
| Comparative Example 7 | malonic acid | 0.5 | Poor | Good |
| Comparative Example 8 | levulinic acid | 0.5 | Poor | Good |

The results of Examples and Comparative Examples stated above will be considered.

Comparison between Examples 1 to 6 and Comparative Examples 1 to 6 shows that when the compound in which the carboxyl group is protected by the trialkylsilyl group is used as the flux component, both the connection resistance of 3216-sized chip resistor component and the changes in the viscosity when it is stored at 25° C. for 48 hours are acceptable. In Comparative Examples 1 to 6, it is considered that malonic acid or levulinic acid reacts with the oxide film of the solder powder to form a salt under the environment of 25° C. It is believed that the salt stated above accelerates the curing of the epoxy. On the other hand, in Examples 1 to 6, the compound (A) in which the carboxyl group is protected by the trialkylsilyl group is used, and the reaction between the oxide film of the solder powder and the carboxylic acid is suppressed under the environment of 25° C. Therefore, it is considered that the increase in the viscosity is suppressed even when the solder powder is left to stand still for 48 hours at 25° C. Further, it is believed that the compound (A) is hydrolyzed by heating and exhibits a flux effect as the carboxyl group for removing the oxide film of the solder.

Meanwhile, in Comparative Examples 7 and 8, malonic acid or levulinic acid in which the carboxyl group is not protected is added. In Comparative Examples 7 and 8, none of the solder pastes thicken in the environment of 25° C. because the addition amount is small. However, since the blending amount is small, a sufficient flux effect cannot be exhibited. In all cases, the connection resistance of the 3216-sized chip resistor component is unacceptable.

The solder paste according to one aspect of the present disclosure contains the solder powder; and the flux component containing the compound having at least one carboxyl group protected by the trialkylsilyl group.

The mounting structure according to another aspect of the present disclosure is a mounting structure that an electronic component is mounted on a board, in which an electrode of the electronic component and an electrode of the board are bonded by a solder bonding portion formed using the solder paste stated above.

The present disclosure can provide the solder paste containing the flux component, which has excellent physical properties upon storage and soldering.

The solder paste of the present disclosure has an advantageous effect of good stability. The solder paste of the present disclosure is useful as a solder paste for mounting components, and can be advantageously used for forming a mounting structure.

What is claimed is:

1. A solder paste comprising:
    a solder powder; and
    a flux component containing an acid-based compound of at least one selected from the group consisting of bistrimethylsilyl succinate, bistrimethylsilyl glutarate, and trimethylsilyl levulinate.

2. The solder paste of claim 1, wherein the acid-based compound is trimethylsilyl levulinate.

3. The solder paste of claim 1, wherein the solder paste contains the flux component in an amount of 10 parts by mass or more and 40 parts by mass or less based on 100 parts by mass of the solder powder.

4. The solder paste of claim 3, wherein the solder paste contains the acid-based compound in an amount of 5 parts by mass or more and 25 parts by mass or less based on 100 parts by mass of the flux component.

5. The solder paste of claim 1, wherein
    the solder powder contains at least two selected from the group consisting of Sn, Bi, In, and Ag, and
    the solder powder has a melting point of 140° C. or lower.

6. A mounting structure having an electronic component mounted on a board,
    wherein an electrode of the electronic component and an electrode of the board are bonded by a solder bonding portion formed using the solder paste of claim 1.

* * * * *